June 18, 1935.　　　　O. WITTEL　　　　2,005,404
MOTION PICTURE FILM MAGAZINE
Filed June 14, 1932　　2 Sheets-Sheet 1

Inventor:
Otto Wittel,
By Newton M. Perrins
George A. Gillette, Jr.
Attorneys

June 18, 1935.  O. WITTEL  2,005,404

MOTION PICTURE FILM MAGAZINE

Filed June 14, 1932   2 Sheets-Sheet 2

Inventor:
Otto Wittel,
By Newton M. Perrin
George A. Gillette, Jr.
Attorneys

Patented June 18, 1935

2,005,404

UNITED STATES PATENT OFFICE 2,005,404

MOTION PICTURE FILM MAGAZINE

Otto Wittel, Rochester, N. Y., assignor to Eastman Kodak Company, Rochester, N. Y., a corporation of New York Application June 14, 1932, Serial No. 617,141

11 Claims. (Cl. 88—16)

The present invention relates to a motion picture film magazine and more particularly to a film magazine for a motion picture camera which is adapted to receive ordinary separate film reels.

In recent years amateur motion picture cameras have been designed for use with separate film reels for containing the film and for individual insertion into the camera. At the present time there is a considerable tendency for the manufacture of a magazine type of amateur motion picture camera.

The primary object of the present invention is the provision of a motion picture film magazine for use in a motion picture camera which was originally designed to receive the film on separate reels.

A further object of the present invention is the provision for a motion picture camera adapted to expose only one-half of the film during each of two runs through the camera, of a film magazine which cooperates which various camera parts to compel inversion of the film magazine during movement thereof from one to the other of two positions and to insure against double exposure of the same half of the film.

Another object of the present invention is the provision of a film magazine containing film cores which are adapted to engage only one of two dissimilar reel engaging means on the spindles in the camera.

A still further object of the present invention is the provision of a film magazine containing film cores and having a central compartment which is laterally offset with respect to the center line between the film cores and which is adapted to cooperate with asymmetrically located camera parts to insure end over end inversion of the film magazine during its movement from one to the other of two positions in the camera.

Still another object of the present invention is the provision of a film magazine having a pair of film cores which are provided with engaging means at one end of each core and which are adapted to be placed over spindles in the camera to engage only one of two dissimilar engaging means on the camera spindles.

Another object of the present invention is the provision of a film magazine containing a pair of film cores with engaging means at one end thereof only and inverted in the magazine with respect to each other, said engaging means on the film cores cooperating with dissimilar engaging means on the camera spindles to insure end over end inversion of the magazine in its movement from one of two positions to the other.

A further object of the present invention is the provision of a film magazine which is provided with a pair of elongated, longitudinal slots permitting the entry of one of the camera parts into the magazine and which are adapted to be closed alternatively by a shutter slidably mounted on the exterior of the magazine.

Still another object of the present invention is the provision of a shutter on the exterior of the magazine which is adapted to close alternatively either of two elongated slots in the magazine and which is adapted to be operated by a projection on the camera cover to be moved into proper position corresponding to its location on the camera.

The above and other objects of the present invention will be apparent to those skilled in the art as the disclosure of my invention is developed hereinafter.

The film magazine of the invention broadly includes a pair of cylindrical boxes for containing the cores and film rolls thereon. It also includes a central compartment rigidly connected between said cylindrical boxes and laterally offset with respect to the center line between the film cores, this offset compartment being adapted to cooperate with camera parts to compel location of the magazine in only two of four possible positions in the camera. Engaging means are provided at one end of each of the film cores which are inverted with respect to each other within the magazine and which cooperate with the camera spindles and dissimilar engaging means thereon also to insure location of the magazine within the camera in only two of four possible positions. Furthermore, the cooperation of the central compartment of the magazine and the camera parts, and between the engaging means of the film cores and the engaging means on the camera spindles, both function to insure end over end inversion of the magazine upon movement from one of the two possible positions to the other. In a modified form of the film magazine, a pair of elongated slots are provided in the casing to permit the entrance of the arm of a footage indicator into the magazine and to make contact with the outer convolution of film on the supply roll. This modification also of necessity includes a shutter for closing the elongated apertures to prevent fogging of the film upon removal from the camera, said shutter covering the elongated apertures alternatively and being moved into proper position by a projection on the camera cover.

Reference is hereby made to the accompanying drawings in which similar elements are designated by similar reference numerals and in which.

Figure 1:
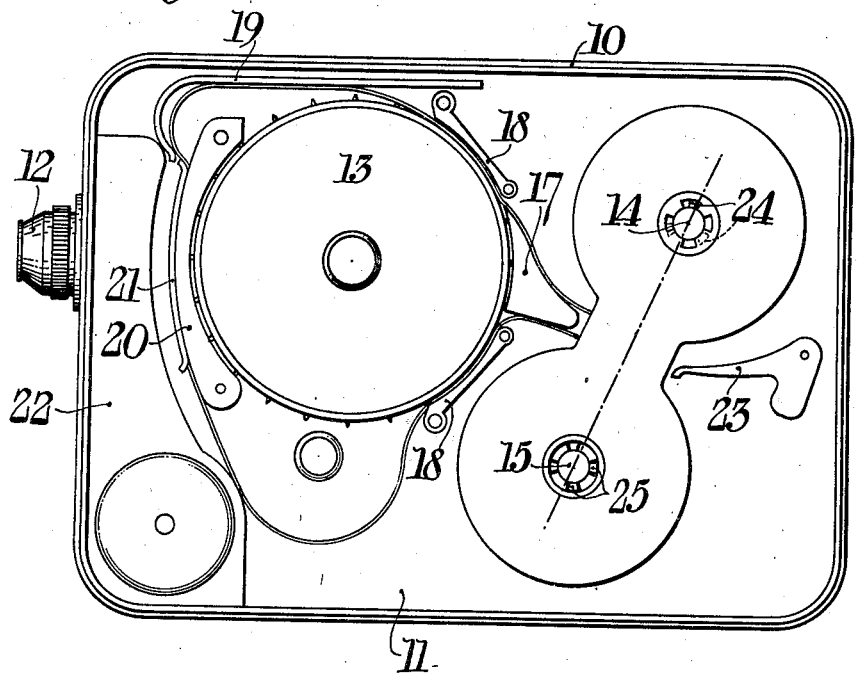
Fig. 1 is a side view of a motion picture camera with the cover removed to illustrate the position of the film magazine of the invention within the camera.
Figure 2:
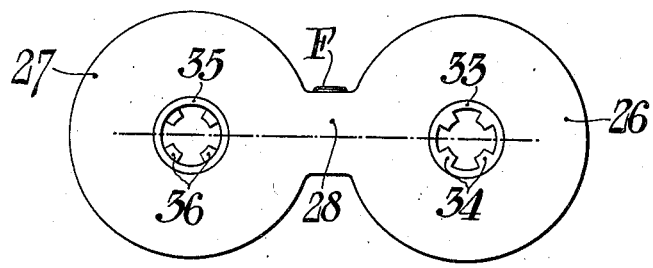
Fig. 2 is an elevation of the film magazine according to the invention and similar to that shown in Fig. 1 but with the engaging means on the film cores more clearly shown because of the elimination of the dissimilar engaging means on the spindles in the camera.

The film magazine of the invention is illustrated as preferably inserted in a camera of the type which exposes only one-half of the film during each of two runs through the camera. However, it is to be understood that the film magazine may be used without alteration in a camera in which the entire width of the film is exposed during a single run through the camera.

In the illustrated embodiment of the invention, the camera comprises a casing 10, which contains a mechanism plate 11 and which is provided with an objective 12. A sprocket wheel 13 is rotatably mounted on mechanism plate 11 and contains a spring motor, not shown, but provided in the manner disclosed in my co-pending application, Serial No. 510,088, filed January 21, 1931 for a Motion picture camera. Spindles 14 and 15 are mounted in the mechanism plate 11, spindle 14 being securely fastened to mechanism plate 11 and spindle 15 being rotatably mounted in mechanism plate 11 for rotation in a known manner through a drive to pulley 16 on the end of spindle 15. The sprocket wheel 13, spindle 14 and spindle 15 are all mounted on the same side of mechanism plate 11 so that the film rolls on spindles 14 and 15 will be located in edge to edge relation to the sprocket wheel 13, as also disclosed in my aforementioned co-pending application.

A nose-piece 17 is mounted upon mechanism plate 11 and is located adjacent the rear of sprocket wheel 13. A pair of guide members 18 are swingably mounted adjacent the sprocket wheel 13 to maintain the film in contact with sprocket wheel 13 at two different portions. A guide plate 19 is located on the mechanism plate near the top edge of the camera. A guideway 20 is located in front of sprocket wheel 13 and cooperates with the presser member 21, which is provided with an aperture, not shown, to maintain the film in proper position with respect to the objective 12. An intermittent pulldown mechanism and governor, not shown, are mounted between face plate 22 and mechanism plate 11. The advancement of the film through the camera may be accomplished in any well-known manner or in the manner quite fully described in the co-pending application of Joseph Mihalyi, Serial No. 595,981, filed March 1, 1932 for a Motion picture pulldown and shutter mechanism.

The path of the film F through the camera is as follows: Over the nose-piece 17, in engagement with sprocket wheel 13, which engagement is insured by one of guide members 18, in a free loop in contact with guide plate 19 and between guideway 20 and presser member 21, again in contact with sprocket wheel 13 maintained by the other guide member 18 and under the nose-piece 17.

A footage indicator including an arm 23 is mounted in mechanism plate 11 and is preferably constructed according to my co-pending application, Serial No. 584,481, filed January 2, 1932 for a Footage indicator for photographic apparatus.

Dissimilar engaging means are provided on each of spindles 14 and 15. The usual purpose and function which these dissimilar engaging means are adapted to perform are fully set forth in my co-pending application, Serial No. 472,678, filed August 2, 1930, for a Motion picture film spooling system. The preferred form of the dissimilar engaging means comprises a plurality of projections on spindle 14 which are spaced some distance above the mechanism plate 11 and a dissimilar number of projections provided on the spindle 15 but which are located thereon in proximity to the mechanism plate 11. Specifically, the engaging means on spindle 14 includes three teeth 24 equally-spaced around the periphery of spindle 14 and located well above or spaced from mechanism plate 11. The specific engaging means on spindle 15 includes four teeth 25 located in quadrature around spindle 15 and axially located on the spindle in close proximity to mechanism plate 11.

The camera mechanism and camera parts thus far described constitute no part of the present invention but are all included in the prior art or in the other co-pending applications referred to. The particular problem at hand is the provision of a film magazine which can be fitted into the camera described in the foregoing and which will cooperate with the camera parts and dissimilar engaging means on the spindles 14 and 15 to limit the number of possible positions of the film magazine in the camera and to insure end over end inversion of the film magazine during movement from one of the two possible positions to the other. It is obvious that the forms of spindles 14 and 15 could differ widely from those shown.

The film magazine of the invention in plan view is preferably in the shape of a dumb-bell, similar or identical cylindrical boxes 26 and 27 forming the ends and a central compartment 28 connecting the boxes 26 and 27. The cylindrical box 26 is provided with a peripheral opening formed between the tongue 29 which overlaps the wall of box 26. The end of tongue 29 and the opposite part of the wall of box 26 are provided with plush or other suitable material for rendering the peripheral opening of box 26 light tight. A tongue 30 is similarly provided on the wall of box 27 to overlap a portion of said wall and is also provided with plush to render that opening light tight. The compartment 28 is rigidly connected between cylindrical boxes 26 and 27. One side of compartment 28 is provided with a pair of inwardly turned lips 32 which are in spaced relation to the respective walls of cylindrical boxes 26 and 27 and which lips form with said walls a pair of openings for passage of the film which are also rendered light tight in a known manner by being lined with plush or other suitable material.

The top and bottom walls of cylindrical boxes 26 and 27 are provided respectively with annular flanges 26' and 27', the function of which is to rotatably support the cores for the film rolls.

Figure 4:
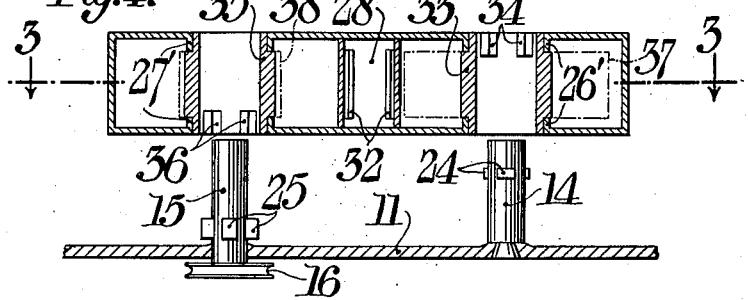
Fig. 4 is a longitudinal, transverse cross-section of the magazine according to the invention taken on the line 4—4 of Fig. 3 and also includes a fragmentary showing of the spindles and dissimilar engaging means of the camera.

The film core 33 is of cylindrical formation and is annularly grooved at its ends to engage and turn within the annular flanges 26'. Film core 33 is provided with an axial hole equal to or greater in diameter than the outside diameter of the engaging means or teeth 24 on spindle 14. Engaging means in the form of inwardly projecting teeth 34 are situated at one end of core 33 and project from the surface of the axial hole through the core. Referring to Fig. 4, it should be noticed that when the magazine is lowered onto the spindles 14 and 15, the teeth 24 on spindle 14 will not touch the teeth 34 on core 33. The core 35 is also annularly grooved at each end for rotatable mounting in annular flanges 27' of cylindrical box 27. Core 35 is also provided with an axial hole equal to or greater in diameter than the outside diameter of the engaging means or teeth 24 on spindle 14. Core 35 is provided internally with teeth 36 which are preferably located in quadrature about the core 35 and adapted to register with or engage the teeth 25 on spindle 15.

Cores 33 and 35 are identical in construction but are placed within the respective cylindrical boxes 26 and 27 in inverted position with respect to each other. Thus, when the magazine is moved down over spindles 14 and 15, teeth 34 will not touch or engage the teeth 24 on spindle 14, as previously explained, but teeth 36 on the interior of core 35 will register with and engage teeth 25 on spindle 15. Consequently, core 35 will be driven by spindle 15 and core 33 will be free to turn within cylindrical box 26 in spite of the engaging means or teeth 24 on spindle 14. Referring still to Fig. 4, if the magazine is inverted end for end, then the teeth 34 on core 33 will engage the teeth 24 on spindle 15 to drive core 33, whereas core 35 will now be free to rotate within cylindrical box 27 and around spindle 14. If, on the other hand, the magazine is turned end for end without being inverted, then teeth 36 within core 35 will strike against the teeth 24 on spindle 14 and prevent the location of the magazine about the spindles 14 and 15 in proper relation for the reeling of film. Thus it will be seen that the engaging means of the spindles 14 and 15 and of the cores 33 and 35 cooperate to insure or require end over end inversion of the magazine in its movement from one position to the other.

Figure 3:
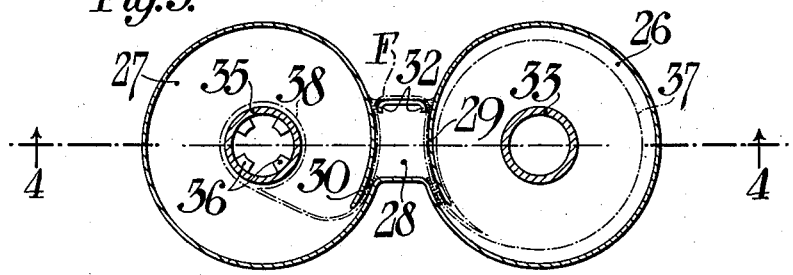
Fig. 3 is a longitudinal, transverse cross-section through the film magazine of the invention taken on the line 3—3 of Fig. 4.

The film F is provided in the usual film rolls, the supply film roll 37 being wound about core 33 and the take-up film roll 38 being wound about the core 35. Referring to Fig. 3, the film in its path from roll 37 to roll 38 passes out of cylindrical box 26 between tongue 29 and the wall of the box, through the light-tight opening between one lip 32 of central compartment 28 and the wall of cylindrical box 26, through the other opening between the second lip 32 and the wall of cylindrical box 27 between tongue 30 and the wall of box 27 to the core 35. When the magazine is within the camera, the film may be formed in a loop for threading through the advancing mechanism of the camera by unwinding the film from supply film roll 37 until sufficient film for the threading has been obtained.

Figure 7:
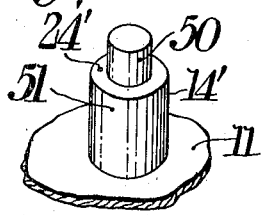
Fig. 7 shows a perspective view of one modified form of the fixed spindle.

For the purposes of the present invention, the fixed spindle may be smooth and symmetrical. Such a form is illustrated in Fig. 7 wherein a substitute spindle 14' is shown. The upper end 50 of spindle 14' has the same diameter as spindle 14, that is, it just fits within teeth 34, but the lower part 51 is of larger diameter fitting within the axial hole in core 33. The shoulder 24' at the end of the enlarged portion 14' abuts against the lower ends of teeth 34 when the magazine is properly in place and prevents the magazine being inserted over the shaft with the teeth down.

The central compartment 28 is rigidly connected to or is integral with the cylindrical boxes 26 and 27. This compartment joins each box containing film and covers the light-tight openings formed between the tongues 29 and 30 and the walls of the respective cylindrical boxes 26 and 27. The provision of the light-tight openings between the lips 32 and the walls of the cylindrical boxes 26 and 27 decreases the possibility of fogging the film contained in either of the cylindrical boxes because a double light trap is formed between the exterior of the magazine and the interiors of the cylindrical boxes 26 and 27. The central compartment 28 is laterally offset with respect to the center line between the cores 33 and 35, that is, the wall of central compartment 28 which supports lips 32 is farther from the center line between cores 33 and 35 than the opposite wall of the compartment which is integral with or attached to the walls of cylindrical boxes 26 and 27. The purpose of this lateral offset for central compartment 28 is to furnish a cooperation between two camera parts which are asymmetrically located with respect to the center line between spindles 14 and 15 so that the magazine must be turned end for end and inverted in its movement from one of two possible positions to the other. Thus, the various engaging means on the spindles 14 and 15 and cores 33 and 35 insure such end over end inversion of the magazine and are supplemented in their function by the laterally offset central compartment 28 which cooperates with the nose-piece 17 and footage indicator arm 23 of the camera to also insure this end over end inversion of the magazine. The footage indicator arm 23 is locked in the position shown in Fig. 1 during threading of the film into the camera. The construction of the footage indicator to accomplish this function is adequately explained in my co-pending application, Serial No. 584,481 for a Footage indicator for photographic apparatus.

Figure 5:
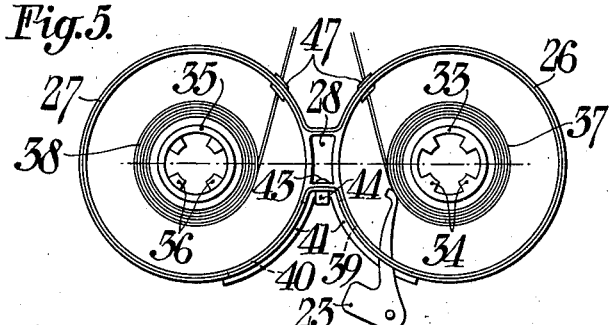
Fig. 5 is a top view of a modified form of the film magazine according to the invention without the cover and includes the arm of the footage indicator on the camera making contact with the outer convolution of the supply film roll.
Figure 6:
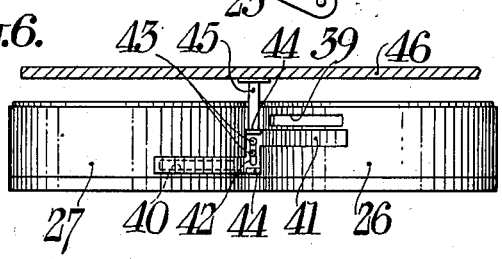
Fig. 6 is a side elevation of the modified form of magazine with the cover removed showing the elongated apertures and the shutter for alternatively closing the same. A fragment of the camera cover and projection thereon for actuating the shutter on the magazine is also shown.

However, in using a magazine in a camera provided with such a footage indicator, the footage indicator will remain unused unless the arm 23 is permitted to make contact with the outer convolution of supply film roll 37. Consequently, a modified form of magazine is disclosed, see Figs. 5 and 6, wherein the cylindrical boxes 26 and 27 are provided with elongated apertures 39 and 40. Elongated aperture 39 is laterally displaced from a central, longitudinal, transverse plane through the magazine in one direction while the elongated aperture 40 is displaced an equal distance in the opposite direction from such imaginary, longitudinal, transverse plane. In other words the elongated apertures 39 and 40 are provided in respective walls of cylindrical boxes 26 and 27 and are each spaced an equal distance from the opposite flat walls of the magazine, this spacing being such that the footage indicator arm 23 may enter aperture 39 when the magazine is in one position and arm 23 may enter elongated aperture 40 when the magazine is in the other of the two positions.

In order to prevent fogging of the film within the cylindrical box 26 or 27, a shutter 41 is slidably mounted by means of a slot 42 and pins 43 on the wall of central compartment 28. The shutter 41 has a butterfly profile and is adapted to alternatively cover either elongated aperture 39 or elongated aperture 40. The shutter 41 is provided with a pair of lugs 44 which are adapted to cooperate with a projection 45 on the inner face of camera cover 46 so that shutter 41 will automatically be moved to close the elongated aperture in the cylindrical box into which the film is to be fed and simultaneously to open the elongated aperture in the cylindrical box from which the film is to be fed. Thus, the footage indicator arm 23 is free to enter the appropriate elongated aperture and will be released by placement of the camera cover 46 in position on the camera, as explained in my co-pending application, Serial No. 584,481. Obviously, the interior of either cylindrical box 26 or cylindrical box 27 will always be open to light. However, after the first run of film has been completed, all of the film will be in the cylindrical box which is tightly light sealed by the other blade of shutter 41.

Since many modifications of the film magazine according to the present invention will be suggested by this disclosure to those skilled in the art, the illustration and description as here presented is to be construed in an illustrative and not in a limiting sense; as, for instance, the film may be conducted from and to cylindrical boxes 26 and 27 by single light traps 47 provided in the walls of the cylindrical boxes which are not covered by the central compartment.

Having now particularly described my invention what I claim as new and desire to secure by Letters Patent of the United States is:

1. The combination with a magazine adapted to contain motion picture film, of a pair of film cores rotatably mounted in said magazine and each provided with an axial hole, and a plurality of teeth within each hole and adjacent one end of each core, said cores being inverted with respect to each other and available to both sides of said magazine.

2. The combination with a motion picture camera containing a pair of spindles and a camera part spaced from the center line between said spindles, of a magazine including a pair of cores adapted interchangeably to fit over both of said spindles and including a laterally offset central compartment having one wall spaced from the center line between said cores a distance less than the spacing between the camera part and the center line between said spindles and having another wall spaced from the center line between said cores a distance greater than the spacing between the camera part and the center line between said spindles.

3. The combination with a motion picture camera containing a pair of spindles and dissimilar engaging means on each spindle, of a magazine adapted to assume two positions within said camera and containing a pair of cores each having at one end an engaging means adapted to register with one but not the other of said dissimilar engaging means, said cores being inverted with respect to each other and provided with an axial hole adapted to fit over the other dissimilar engaging means without engaging the same.

4. The combination with a motion picture camera containing a spindle having a plurality of projections and a second spindle having a plurality of projections different in number from those on the first mentioned spindle, of a magazine adapted to assume two positions within said camera and a pair of cores provided with axial holes adapted to fit over without engaging the projections on one spindle and having a plurality of projections at one end adapted to register with the projections on the other spindle, said cores being inverted with respect to each other within said magazine to require end over end inversion of the magazine upon movement from one position to the other.

5. The combination with a motion picture camera containing a camera part, a pair of spindles, and dissimilar engaging means adjacent opposite ends of each spindle, of a magazine adapted to assume two desired out of several operative positions within said camera, a pair of film cores provided with axial holes for said spindles and each having similar engaging means within said holes at opposite ends of respective cores and which are adapted alternatively to cooperate with the engaging means on one but not the other of said spindles, and means on said magazine for cooperating with said camera part and supervising the interengagement between the cooperative engaging means on one of the cores and one of the spindles after inversion of the magazine.

6. The combination with a motion picture camera containing a spindle having four radially extending teeth at the lower end thereof, and a second spindle having three radially extending teeth intermediately located thereon, of a magazine adapted to assume two positions within said camera, and a pair of cores each provided with an axial hole adapted to fit over without engaging the teeth on said second spindle and each provided at one end with four teeth adapted to register with and engage the teeth on the first mentioned spindle, said cores being inverted with respect to each other within said magazine.

7. The combination with a magazine adapted to contain motion picture film and provided with a pair of apertures laterally and longitudinally displaced with respect to each other, of a shutter mounted for lateral movement and having a pair of blades which are longitudinally displaced for covering respective apertures and which are laterally displaced a distance less than the lateral displacement of said apertures for only alternatively covering said apertures.

8. In a motion picture camera, the combination with a film magazine provided with a pair of laterally and longitudinally offset elongated apertures and adapted to assume two positions inverted with respect to each other within said camera, of a closure means transversely slidable on said magazine and having a pair of laterally displaced lugs, and a cover for said camera having a projection adapted to abut one of said lugs to move said closure means and to uncover only one and the corresponding one of said apertures.

9. The combination with a motion picture apparatus containing an idle spindle and a driven spindle having a clutch component, of a film magazine having space for two rolls of film, each space having a rotatable core with an axial opening extending entirely therethrough and adapted to be positioned on said spindles, and a clutch component in each opening complementary to the clutch component on the driven spindle and situated nearer one end of the axial opening than the other, the idle spindle having an abutment preventing the positioning thereon of the magazine with the clutch component inwardly.

10. The combination with a motion picture apparatus containing an idle spindle and a driven spindle with a clutch component, of a film magazine having space for two rolls of film, and having two rotatable cores with an axial opening extending entirely through each core and adapted to be positioned on said spindles, and similar clutch components in each opening complementary to the clutch component on the driven spindle, one clutch component being situated near one end of one axial opening and the other similar clutch component being situated near the opposite end of the other opening, the idle spindle having an abutment preventing the positioning thereon of the magazine with the clutch component inwardly.

11. A magazine for motion picture apparatus having space for two rolls of film and having two rotatable cores with axial openings extending entirely through said cores and open on each side of the magazine, and similar clutch components in each opening, one clutch component being situated near one end of one axial opening and the other being situated near the opposite end of the other opening.

OTTO WITTEL.